Figure 1:
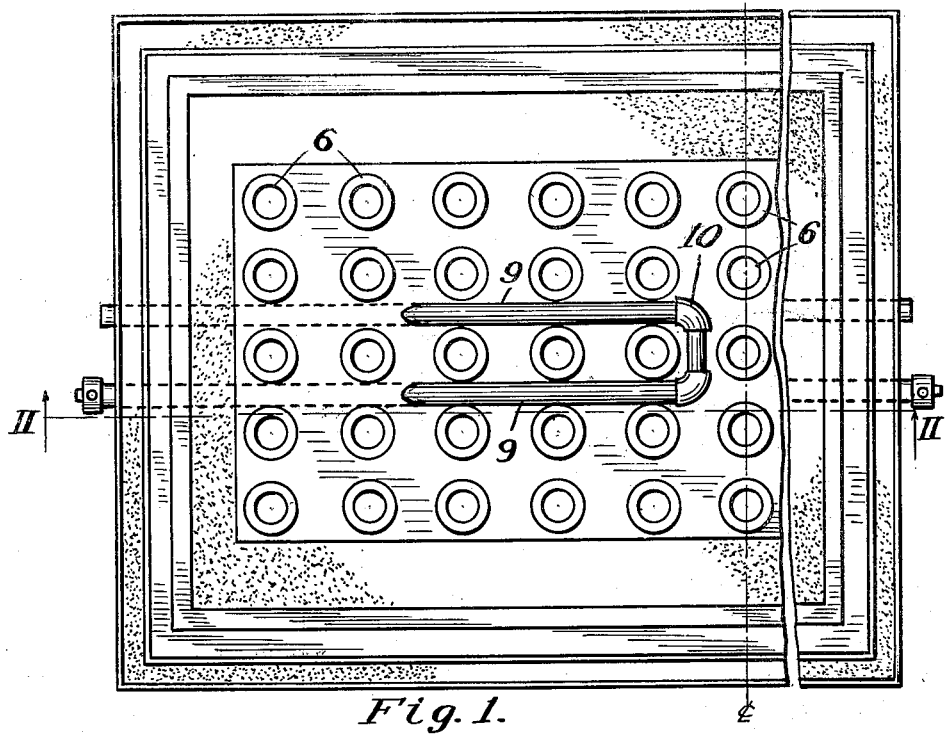

Feb. 12, 1952 — C. M. YAEGER — 2,585,892

ANNEALING FURNACE

Filed June 30, 1949

Inventor
Carl M. Yaeger
Attorney

Patented Feb. 12, 1952

2,585,892

UNITED STATES PATENT OFFICE 2,585,892

ANNEALING FURNACE

Carl M. Yaeger, Fairview Village, Ohio, assignor to Jones & Laughlin Steel Corporation, Pittsburgh, Pa., a corporation of Pennsylvania Application June 30, 1949, Serial No. 102,376

3 Claims. (Cl. 263—42)

This invention relates to annealing furnaces, and in particular to cover-type annealing furnaces used for heat treating thin gauge ferrous material in the form of coils or stacked sheets.

It is an object of my invention to provide a furnace requiring less time than heretofore for heating strip or sheet. It is another object to increase the uniformity of temperature which may be obtained in such a furnace.

Cover-type annealing furnaces are widely used in the processing of ferrous sheet and strip. Such furnaces, as conventionally constructed, comprise a base and a removable cover. The cover consists of a top and four sides adapted to fit over the base and enclose the charge to be heated. The means for supplying heat to the charge are incorporated in the cover and may be heating elements in the side or end walls. Electrical resistance units or gas-fired radiant heating tubes are generally used. If the latter, the combustion of the gas in the tube heats the tube, which transfers this heat to the furnace interior by radiation. The side walls and roof of the furnace cover are lined with refractory material, and the lower edge of the cover is generally provided with a flange which fits into a channel around the base and may be sealed with sand or similar material. This cover is lifted on and off the base by a crane, the connections to electrical circuits, gas and air lines and flues being arranged for convenient connection and disconnection.

The conventional furnace base usually consists of a steel shell in the form of a shallow tray having a solid refractory lining surmounted by brick checkerwork or stools of steel construction supporting a floor plate, upon which the charge rests. It is customary in steel mills to provide more bases than covers, as covers are not needed while material is being loaded onto a base or removed therefrom after treatment or cooling during the last portion of the annealing cycle.

One of the principal objects in the design of heat-treating furnaces of most types is the maintenance of a uniform temperature throughout the charge being treated. In cover-type furnaces for treating strip or sheet, the arrangement of the heating means, as well as other factors affecting heat distribution, has been the subject of considerable investigation, as the conditions in furnaces of this type are inherently unfavorable to uniform heating. The charge is present either as coils, usually tightly wrapped, or as stacks of individual sheets, presenting solid masses of metal of large thermal inertia. Furthermore, these are generally enclosed in sealed boxes to prevent oxidation. The heating of the charge thus proceeds very slowly, not infrequently extending over periods exceeding twenty-four hours. In operation the rate of heat input in such a furnace is limited among other factors by the rate of heat absorption in the zone of the furnace least favorably heated. If, to accelerate heating in this zone, the heat input to the furnace is stepped up, overheating may occur in regions of more rapid heat absorption.

I have discovered that one factor limiting the rate of heating charges in cover-type furnaces is the considerable absorption of heat from the charge by the furnace floor plate, stools and refractories in the base. The heating means in the furnace walls are designed and positioned to transfer heat to the charge but are not well adapted to heat the base, which, furthermore, is shielded from the heating means by the material charged thereon. Consequently, although heat is transferred into the charge through its faces adjacent the heating means, I have found that a considerable quantity is transferred by conduction out of the charge, into the floor plate and other base furniture. This continues until the base temperature reaches the temperature of the charge, that is to say, throughout the whole of the heating period. This heat transfer from charge to base prolongs the heating period and aggravates temperature differences normally existing between the top and bottom of the charge.

I have further discovered that these conditions can be alleviated by the provision of heating means suitably disposed in the furnace base. In a preferred form of my invention, I provide a furnace of the cover type, having heating means in the side walls of the furnace and additional heating means centrally located in its base. The heating tubes or other means in the cover or superstructure furnish the great bulk of the heat required for the heat treatment of the charge. The heating tubes in the furnace base furnish a relatively small proportion of the total heat required but supply this heat under the floor plate in the central zone of the base, a region relatively poorly heated in conventional cover-type furnaces. This relatively small amount of heat supplied through the furnace base in accordance with my invention makes possible a great improvement in the heating characteristics of the furnace with a consequent increase in furnace productivity. The details of my invention will be explained in the course of the following description of the preferred embodiment above mentioned, which is illustrated in the accompanying drawings.

In the drawings Figure 1 is a plan view of the base of a furnace constructed according to my invention as it would appear with the floor plate removed. Only the left-hand end of the base is shown, it being understood that the right-hand end is a duplicate thereof.

Figure 2:
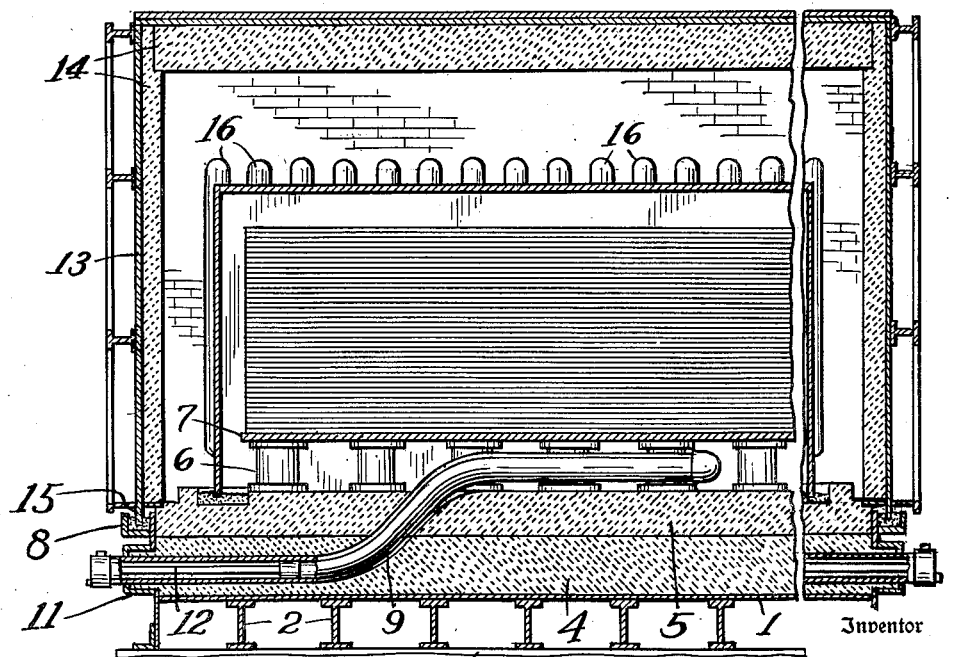

Figure 2 is an elevation, partly in section, of a furnace constructed according to my invention, taken on the plane II—II of Figure 1.

In these figures the furnace base comprises a shallow rectangular metal shell 1, supported on I-beams 2 or other suitable supports above the shop floor 3. This shell 1 is filled with a layer 4 of refractory material, which may be ordinary brick, or tile standing on end and filled with sand. Above this is a layer 5 of insulating brick. Upon this brick are spaced stools 6 which may be of welded steel construction. These stools are uniformly located over the base and carry the floor plate 7, which is a heavy steel plate upon which the charge to be treated is placed. A channel 8 is provided around the outer edge of the base, which cooperates with means carried by the cover to seal off the furnace interior from the atmosphere.

I provide in each end of the furnace base a U-shaped heating tube having parallel legs 9 and a cross leg 10. The ends of this tube are brought out through sealing boxes 11 attached to the end of the base shell 1 and filled with sand or other suitable material. The outer end portions of the parallel legs 9 of the heating tube lie within the refractory layer 4 in channels provided therein. The parallel legs 9 are bent or offset in the vertical plane as shown in Figure 2 so that their inner end portions and the cross leg 10 lie above the insulating brick layer 5, but below the floor plate 7. A gas burner 12 is located in the open end of one of the parallel legs 9 of the heating tube and in operation the open end of the other parallel leg 9 is connected to a flue, not shown. The gas burner 12 is provided with gas and air connections, not shown.

The disposition of the heating tubes in the base is evident from Figure 1. The furnace illustrated is provided with a total of fifty-five stools arranged in five rows of eleven stools each. Each heating tube is placed so that its parallel legs 9 straddle the center row of stools. The cross leg 10 of the left-hand tube is seen to lie between the fifth and sixth stools in the center row, and the cross leg of the right-hand tube will lie between the sixth and seventh stools in this row. The heating tubes thus supply heat beneath the central area only of the floor plate 7 and do not furnish any considerable amount of heat to other regions of the furnace. This function is assigned to the heating means in the furnace cover, which I will now describe.

The cover comprises a metal shell 13 having a top and four sides lined with refractories 14. A sealing flange 15 fits into the channel 8 of the base. Heating tubes 16 are provided in side walls of the cover for supplying heat to the furnace charge. These tubes may be equipped with gas burners similar to the burner 12 shown in the parallel leg 9 of the base heating tube.

As I have mentioned, the heating tubes which I provide in the furnace base operate in conjunction with the heating tubes in the furnace cover to supply heat to the charge. These base heating tubes may be controlled independently of the others, however, to achieve advantageous results. Thus, when the heating of a charge is commenced, it may be necessary to operate the main heating means at less than full throttle to avoid overheating the outside regions of the charge. The base heating means, however, may be operated at full heat output to facilitate the heating of the floor plate, stools and base refractories and thus cut down or even reverse heat transfer from charge to base. When the charge has reached the desired temperature and soaking commences, it may be desirable to throttle the base heating means more than the main heating means or shut off the base heating means altogether, as heat loss through the furnace base may be less than through the cover walls.

It will be seen from the foregoing description that I have invented a furnace providing greater uniformity of temperature throughout the charge and more rapid heating, thus making possible increased production over that obtained from conventional furnaces.

Although I have described and illustrated the present preferred embodiment of my invention, it will be understood that the invention is not limited thereto but may be otherwise embodied or practiced within the scope of my claims.

I claim:

1. In a heating furnace having a rectangular base and cover, the cover being provided with means for introducing heat into the furnace charge, and the base being provided with a plurality of supports carrying a floor plate on which the furnace charge rests, the improvement consisting in that the said supports are free standing supports spaced to permit the free circulation of the furnace atmosphere above and below the floor plate, and U-shaped heating tubes disposed in the center portion only of the base below the floor plate and between the supports, the tubes being positioned with the long sides of the U parallel to the long sides of the rectangular furnace base and cooperating with the heating means of the cover to maintain uniformity of temperature within the furnace.

2. In a heating furnace having a rectangular base and a cover, the cover being provided with means for introducing heat into the furnace charge and the base being provided with a plurality of supports carrying a floor plate on which the furnace charge rests, the improvement consisting in that the said supports are free-standing supports spaced to permit the free circulation of the furnace atmosphere above and below the floor plate, and heating tubes disposed in the center portion only of the base below the floor plate and between the supports, these heating tubes cooperating with the heating means of the cover to maintain uniformity of temperature within the furnace.

3. In a heating furnace having a rectangular base and a cover, the cover being provided with means for introducing heat into the furnace charge and the base being provided with a plurality of supports carrying a floor plate on which the furnace charge rests, the improvement consisting in that the said supports are free-standing metal supports spaced to permit the free circulation of the furnace atmosphere above and below the floor plate, and heating tubes disposed in the center portion only of the base below the floor plate and between the supports, these heating tubes being adapted and adjusted to furnish a minor portion only of the heat required by the charge and cooperating with the heating means of the cover to maintain uniformity of temperature within the furnace.

CARL M. YAEGER.

REFERENCES CITED

The following references are of record in the file of this patent:

UNITED STATES PATENTS

| Number | Name | Date |
|---|---|---|
| 2,137,040 | Woodson | Nov. 15, 1938 |
| 2,171,777 | Woodson | Sept. 5, 1939 |
| 2,188,133 | Hepburn | Jan. 23, 1940 |
| 2,201,308 | Edge | May 21, 1940 |